United States Patent
Tiirola et al.

(10) Patent No.: US 10,477,525 B2
(45) Date of Patent: *Nov. 12, 2019

(54) METHOD AND DEVICE FOR PROCESSING UPLINK CONTROL DATA IN A WIRELESS NETWORK

(71) Applicant: Nokia Solutions and Networks Oy, Espoo (FI)

(72) Inventors: Esa Tapani Tiirola, Kempele (FI); Timo Erkki Lunttila, Espoo (FI); Kari Juhani Hooli, Oulu (FI); Kari Pekka Pajukoski, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 15/581,666

(22) Filed: Apr. 28, 2017

(65) Prior Publication Data
US 2017/0238308 A1 Aug. 17, 2017

Related U.S. Application Data

(63) Continuation of application No. 14/113,601, filed as application No. PCT/EP2011/056867 on Apr. 29, 2011, now Pat. No. 9,668,245.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0035* (2013.01); *H04W 72/00* (2013.01);
(Continued)

(58) Field of Classification Search
CPC .......... H04W 72/0413; H04W 72/0406; H04L 5/0035
See application file for complete search history.

(56) References Cited

U.S. PATENT DOCUMENTS

| | | |
|---|---|---|
| 2007/0259635 A1 | 11/2007 | Oh |
| 2008/0233966 A1 | 9/2008 | Scheim |

(Continued)

FOREIGN PATENT DOCUMENTS

| | | |
|---|---|---|
| CN | 101777940 A | 7/2010 |
| CN | 101932005 A | 12/2010 |

(Continued)

OTHER PUBLICATIONS

ZTE; R1-091421, PUCCH resource region for LTE-A; 3GPP TSG RAN WG1 Meeting #56is; Seoul, Korea; Mar. 23-27, 2009.

(Continued)

*Primary Examiner* — Khaled M Kassim
*Assistant Examiner* — Syed Ali
(74) *Attorney, Agent, or Firm* — Harrington & Smith (57) ABSTRACT

A method and device for processing data in a wireless communication network is provided, where at least two resource pools for an uplink control channel are provided for mobile terminals for a geographical area, and where the mobile terminals in the geographical area uses at least one of the at least two resource pools for the uplink control channel. In addition, a corresponding device and system are suggested.

17 Claims, 4 Drawing Sheets

(51) Int. Cl.
*H04W 72/00* (2009.01)
*H04B 7/024* (2017.01)
*H04W 28/06* (2009.01)
*H04W 88/02* (2009.01)
*H04W 88/08* (2009.01)

(52) U.S. Cl.
CPC ......... *H04W 72/0406* (2013.01); *H04B 7/024* (2013.01); *H04W 28/06* (2013.01); *H04W 88/02* (2013.01); *H04W 88/08* (2013.01)

(56) References Cited

U.S. PATENT DOCUMENTS

| | | |
|---|---|---|
| 2010/0020702 A1 | 1/2010 | Wong |
| 2010/0061360 A1* | 3/2010 | Chen ............... H04L 5/0023 370/342 |
| 2010/0062795 A1 | 3/2010 | Lee |
| 2010/0106828 A1 | 4/2010 | Palanki |
| 2010/0142467 A1 | 6/2010 | Tiirola et al. |
| 2010/0151873 A1 | 6/2010 | Gorokhov |
| 2011/0081904 A1 | 4/2011 | Kuo |
| 2011/0243191 A1 | 10/2011 | Nakao et al. |
| 2011/0286414 A1* | 11/2011 | Qu ............... H04L 1/1854 370/329 |
| 2011/0294529 A1* | 12/2011 | Luo ............... H04L 5/0035 455/509 |
| 2012/0051265 A1 | 3/2012 | Shen |
| 2012/0106374 A1* | 5/2012 | Gaal ............... H04L 5/0048 370/252 |
| 2012/0184206 A1* | 7/2012 | Kim ............... H04L 5/0091 455/9 |
| 2012/0207077 A1* | 8/2012 | Iwai ............... H04B 7/024 370/312 |
| 2013/0201946 A1* | 8/2013 | Lunttila ............... H04W 24/02 370/329 |
| 2013/0242817 A1 | 9/2013 | He |
| 2014/0011535 A1 | 1/2014 | Jeon |
| 2014/0044085 A1 | 2/2014 | Hong |
| 2014/0133340 A1* | 5/2014 | Zhou ............... H04L 25/0204 370/252 |
| 2014/0211732 A1 | 7/2014 | Nogami |
| 2014/0211737 A1* | 7/2014 | Takeda ............... H04W 52/146 370/329 |
| 2015/0023317 A1 | 1/2015 | Yokomakura |
| 2015/0092632 A1 | 4/2015 | Park |
| 2015/0117342 A1 | 4/2015 | Loehr |
| 2015/0249517 A1* | 9/2015 | Seo ............... H04W 16/10 370/329 |
| 2015/0365207 A1 | 12/2015 | Lan |
| 2015/0373626 A1* | 12/2015 | Yi ............... H04W 48/20 375/132 |
| 2016/0309355 A1* | 10/2016 | Seo ............... H04W 8/005 |

FOREIGN PATENT DOCUMENTS

| | | |
|---|---|---|
| EP | 2357733 A1 | 8/2011 |
| JP | 2009/272827 A | 11/2009 |
| JP | 2011518474 A1 | 6/2011 |
| WO | WO-2009118285 A2 | 10/2009 |
| WO | WO-2010067598 A1 | 6/2010 |
| WO | WO-2010/083782 A1 | 7/2010 |
| WO | WO-2010/106786 A1 | 9/2010 |

OTHER PUBLICATIONS

Nokia Siemens Networks et al.; R1-112387, On the PUCCH Modifications for CoMP; 3GPP TSG RAN WG1 Meeting #66; Athens, Greece Aug. 22-26, 2011.

3GPP TSG RAN WG1 Meeting #56bis; Soeul, Korea; Mar. 23-27, 2009; "Discussion on PUCCH coordination for UL CoMP"; R1-091165; 3 pgs.

3GPP TSG RAN WG1 Meeting #58 Shenzhen, China; Aug. 24-28, 2009; "Comparison of Orthogonal/Non-Orthogonal CoMP transmission for PUCCH", R1-093460; 5 pgs.

\* cited by examiner

| Control channel element | PDCCH (cell#1) | PDCCH (cell#2) | | A/N resource indx | Allocated A/N resourcee w/o DAMI | Allocated PUCCH A/N resource Cell #1 | Allocated PUCCH A/N resource w/ DAMI, Cell #2 |
|---|---|---|---|---|---|---|---|
| 0 | | | | 0 | | | |
| 1 | | | | 1 | | | |
| 2 | | UE#6 | | 2 | UE #6 | | UE #6 (DAMI=0) |
| 3 | UE #1 | | | 3 | UE #1 | UE #1 | |
| 4 | | | | 4 | | | |
| 5 | | | | 5 | | | |
| 6 | | | | 6 | | | |
| 7 | | | | 7 | | | |
| 8 | | | | 8 | | | |
| 9 | | UE#7 | | 9 | UE #7 | | UE #7 (DAMI=0) |
| 10 | UE #2 | | | 10 | UE #2 | UE #2 | |
| 11 | | | | 11 | | | |
| 12 | | | | 12 | | | |
| 13 | | | | 13 | | | |
| 14 | | | | 14 | | | |
| 15 | | | | 15 | | | |
| 16 | UE#3 | UE#8 | | 16 | UE#3, UE#8 | UE #3 | UE #8 (DAMI=-1) |
| 17 | | | | 17 | | | |
| 18 | UE#4 | UE#9 | | 18 | UE#4, UE#9 | UE #4 | UE #9 (DAMI=1) |
| 19 | | | | 19 | | | |
| 20 | | | | 20 | | | |
| 21 | UE#5 | UE#10 | | 21 | UE #10 | | UE #10 (DAMI=0) |
| 22 | | UE#11 | | 22 | UE #5, UE #11 | UE #5 | UE #11 (DAMI=1) |
| 23 | | UE#12 | | 23 | UE #12 | | UE #12 (DAMI=1) |
| 24 | | | | 24 | | | |
| 25 | | UE#13 | | 25 | UE #13 | | UE #13 (DAMI=0) |
| 26 | | | | 26 | | | |
| 27 | | | | 27 | | | |
| 28 | | | | 28 | | | |
| 29 | | | | 29 | | | |

Fig.4

METHOD AND DEVICE FOR PROCESSING UPLINK CONTROL DATA IN A WIRELESS NETWORK

This application is a continuation of U.S. application Ser. No. 14/113,601, entitled Method and Device for Processing Uplink Control Data in a Wireless Network, filed on Oct. 24, 2013, which is hereby incorporated by reference in its entirety.

The invention relates to a method and to a device for processing data in a wireless network.

Considering high frequency reuse, e.g., of a Long Term Evolution (LTE) system, Physical Uplink Control Channel (PUCCH) coverage may be considered as a limiting factor for the performance, in particular of said LTE system. Limited PUCCH coverage may be caused by high frequency reuse (e.g., in LTE, a tight frequency reuse scheme such as reuse=1 may be assumed). In addition to such high degree of frequency reuse, multiple mobile terminals (also referred to as user equipments (UEs)) within each cell may be sharing the narrowband frequency and time resources of the PUCCH.

In LTE, a physical uplink control channel (PUCCH) setup (from UE to base station) is used also in a Cooperative Multi-Point (CoMP) environment. A cell has its own PUCCH resource pool comprising a PUCCH sequence group, a physical cell identification and related PUCCH configuration parameters. However, as the CoMP environment significantly increases the amount of feedback data (since multi-cell feedback is needed), inter-cell interference increases, which has a negative effect on the PUCCH as the resources within each pool are limited.

The problem to be solved is to provide an efficient solution as how to utilize the limited resources of an uplink control channel (in particular a PUCCH) in a mobile communication environment.

This problem is solved according to the features of the independent claims. Further embodiments result from the depending claims.

In order to overcome this problem, a method for processing data in a wireless communication network,
  wherein at least two resource pools for an uplink control channel are provided for mobile terminals for a geographical area,
  wherein the mobile terminals in the geographical area uses at least one of the at least two resource pools for the uplink control channel.

Hence, via the at least two resource pools for an uplink control channel the mobile terminal may obtain two configurations, one based on a system information and another via higher layer signaling. The higher layer signaling may comprise a PUCCH resource pool.

The mobile terminal may be configured to use only one resource pool, e.g., the higher layer signaled resource pool. Also, the mobile terminal may use several resource pools.

Each resource pool comprises, e.g., logical channels and/or physical resource blocks. It is an option that each of the uplink control channel resource pools is backwards compatible (i.e., it can support legacy UEs).

The solution presented is in particular applicable for a physical uplink control channel (PUCCH) arrangement in case of CoMP (cooperative or coordinated multi-point) transmission and/or reception.

The approach presented in particular relates to an LTE-Advanced and could become part of LTE Release 11 or later releases. The proposed solution allows utilizing orthogonal and non-orthogonal resources in an optimized manner. PUCCH coverage can be maintained when significantly increasing a CSI payload (which may be a requirement for CoMP). Also, the size of CoMP-area specific PUCCH can be minimized thereby also reducing the PUCCH overhead. The approach can be flexibly used in various CoMP deployment scenarios.

In an embodiment, the geographical area is determined by a cell or by a group of cells.

It is noted that a cell can be associated or determined by a base station, also referred to as an eNB. The base station can also comprise several cells.

In another embodiment, the at least two resource pools comprise a cooperative multipoint-specific resource pool.

In a further embodiment, at least one of the two resource pools corresponds to a cell-specific uplink control channel that is derived from system information.

In a next embodiment, the resource pool for the uplink control channel comprises
  a cell-specific uplink control channel in particular with separate uplink control channel resources allocated to different cells; and
  a cooperative multipoint-specific uplink control channel having common uplink control channel resources allocated to multiple cells.

Within the groups, resources for cells may be spatially separated so as not to (substantially) interfere with each other. Then a mobile station can be configured with multiple PUCCH configurations for different setups (e.g., cell-specific PUCCH/CoMP (area)-specific PUCCH). An advantage of this approach is that when the CoMP feedback increases, due to the separation of the PUCCH resources, inter-cell interference does not have a large impact. Also, the feedback overhead can be reduced.

It is also an embodiment that the cooperative multipoint-specific uplink control channel is determined for a geographical area.

Pursuant to another embodiment, uplink control channel blanking is used to free resources for the cooperative multipoint-specific uplink control channel.

According to an embodiment, a resource pool corresponding to the cooperative multipoint-specific uplink control channel is shared with at least one of the cell-specific uplink control channels.

According to another embodiment,
  the cell-specific uplink control channel comprises a persistent uplink control channel resource pool and a dynamic uplink control channel resource pool and
  the cooperative multipoint-specific uplink control channel comprises a persistent uplink control channel resource pool and a dynamic uplink control channel resource pool.

In yet another embodiment, the mobile terminal is configured with one of the following settings:
  the mobile terminal is configured to utilize the cell-specific uplink control channel for persistent and dynamic uplink control channel resource pools;
  the mobile terminal is configured to utilize the persistent uplink control channel resource pool of the cell-specific uplink control channel and the dynamic uplink control channel resource pool of the cooperative multipoint-specific uplink control channel;
  the mobile terminal is configured to utilize the persistent and the dynamic uplink control channel resource pool of the cooperative multipoint-specific uplink control channel.

According to a next embodiment, the resource pool for the uplink control channel is identified via at least one of the following attributes:
- a pre-defined uplink control channel sequence group or sequence group hopping pattern;
- a pre-defined uplink control channel physical layer cell identity, e.g., to derive pseudo random hopping patterns.

Pursuant to yet an embodiment, a modifier index is conveyed in a downlink resource allocation message enabling
- a modification or shift of an allocated uplink resource and/or
- a switching functionality between a cell-specific resource and a cooperative multipoint-specific resource.

The cell-specific resource may be a cell-specific resource pool and the cooperative multipoint-specific resource may be a cooperative multipoint-specific resource pool.

In particular, in order to achieve a balance between inter-cell orthogonality and overhead, an A/N resource allocation on the CoMP-specific PUCCH resource pool may be required, because the same A/N resource may be used in adjacent cells as well. This can be achieved by means of a dynamic A/N modifier index (DAMI) included in DL resource allocation grants. The DAMI is capable of modifying the implicit A/N resource given by the DL resource allocation grant within the CoMP-specific A/N resource pool. Furthermore, it can be used as a switch between cell-specific and CoMP-specific resources pools.

According to a further embodiment, the uplink control channel is a PUCCH.

The problem stated above is also solved by a device for processing data in a wireless network, comprising a processing unit that is arranged
- for providing at least two resource pools for an uplink control channel for mobile terminals for a geographical area,
- for using the at least two resource pools for the uplink control channel by the mobile terminals in the geographical area.

It is noted that the steps of the method stated herein may be executable on this processing unit as well.

The device can in particular be a base station of the wireless network.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

In addition, the problem stated above can be solved by a system for processing data in a wireless network, comprising at least one processing unit or device that is arranged
- for providing at least two resource pools for an uplink control channel for mobile terminals for a geographical area,
- for using at least one of the at least two resource pools for the uplink control channel by the mobile terminals in the geographical area.

Furthermore, the problem stated above can be solved by a mobile terminal comprising at least one processing unit or device that is arranged
- for processing at least two resource pools that are provided for an uplink control channel for a geographical area,
- for using at least one of the at least two resource pools for the uplink control channel in the geographical area.

According to an embodiment, at least one of the two resource pools corresponds to a cell-specific uplink control channel that is derived from system information.

According to another embodiment, a modifier index is conveyed in a downlink resource allocation message enabling
- a modification or shift of an allocated uplink resource and/or
- a switching functionality between a cell-specific resource and a cooperative multipoint-specific resource.

A Cooperative MultiPoint (CoMP) communication scheme in particular refers to downlink transmission and/or uplink reception at multiple transmission and/or reception points being cooperative, where the level of cooperation may range from loose scheduling coordination to joint transmission and/or reception over multiple transmission and/or reception points. A cooperating transmission and/or reception points may be geographically separated. The geographical area corresponding to the set of cooperating transmission, and/or reception points is called as CoMP coordination area. CoMP schemes can be categorized as follows:

Option 1:
  In this scenario, each of the transmission/reception points forms an independent cell.
  All users in all cells transmit on the PUCCH using frequency resources at the edges of the available uplink spectrum. Some kind of interference averaging (i.e. fractional load) is implicitly obtained when, e.g., PUCCH resources are unused due to uplink control information being transmitted over simultaneously allocated PUSCH resources, as well as not all Control Channel Element (CCE) indices are used for DL allocations, thus mapping to a PUCCH resource for A/N signaling. In such scenario, interference may affect a transmission of Channel Quality Indicator (CQI) reports as well as acknowledgment/non-acknowledgement messages (also referred to as A/N-messages).

As a special case of Option 1, the transmission points may be operated in a carrier aggregation fashion in spite of having the same carrier frequency. Considering this case of using carrier aggregation signaling for CoMP, as a form of single-frequency multi-site carrier aggregation, the situation is slightly different: Even though the different transmission points each has a unique cell identification (ID), there is only a single PUCCH used for several aggregated cells, which leads to capacity restraints or high PUCCH overhead.

Option 2:

In this scenario, several (for example all) coordinated transmission/reception points are part of a single logical cell; for the UE, the transmit/receive points may appear as eNB antenna ports in that single logical cell. All the UEs share the same PUCCH in this scenario and hence high PUCCH overhead will be an issue as orthogonal resources are required for all of them.

It is noted that different strategies, e.g., combinations of said options 1 and 2, could be used in downlink or uplink direction and thus efficiently utilize available PUCCH resources.

It is in particular suggested to apply these options 1 or 2 simultaneously or in an alternating order. This allows for an optimized resource utilization in the uplink direction of an LTE environment.

Figure 1:
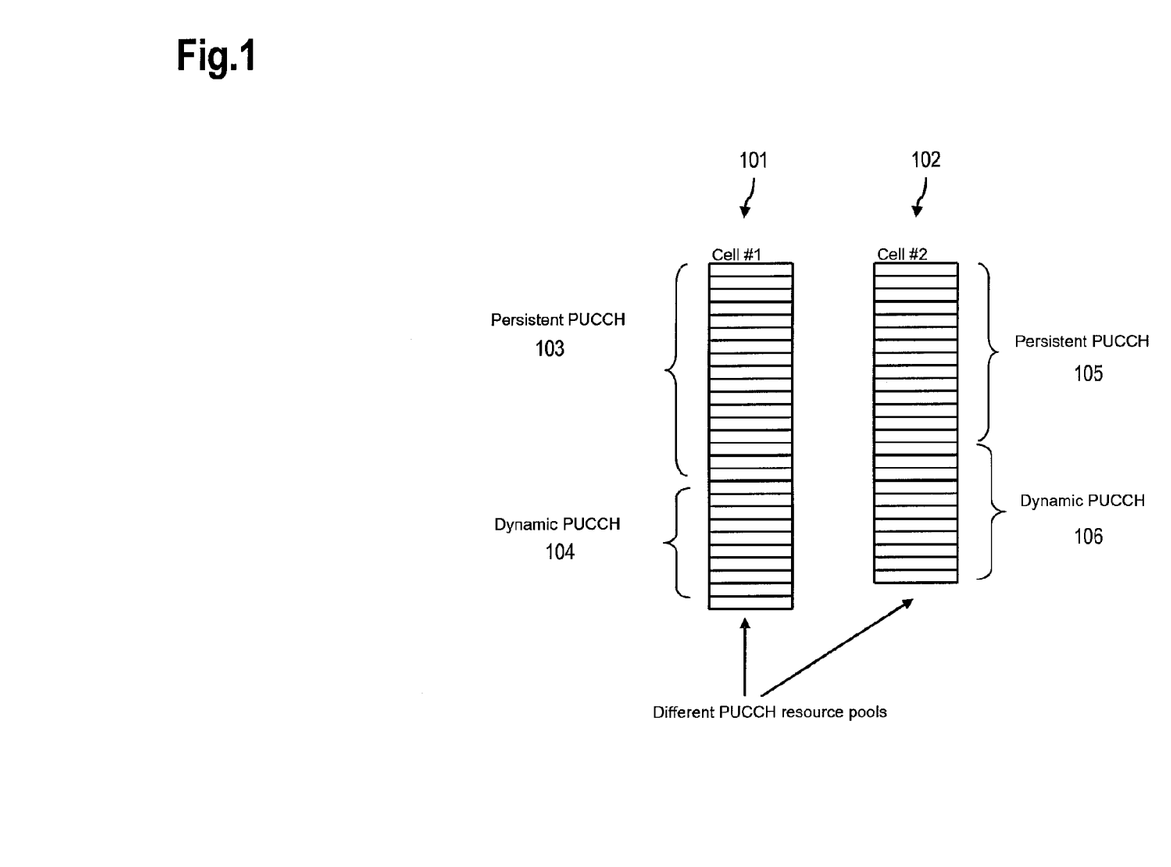
FIG. 1 shows a schematic diagram depicting a PUCCH allocation scheme according to LTE Release-8 to 10 for two cells.

FIG. 1 shows a schematic diagram depicting a PUCCH allocation scheme according to LTE Release-8 to 10 for two cells 101, 102. Each cell 101, 102 has a PUCCH resource pool of its own characterized by a PUCCH sequence group, physical cell identification and related PUCCH configuration parameters. The cell 101 and the cell 102 have several different PUCCH resource pools, wherein the cell 101 has a number of persistent PUCCHs 103 and a number of dynamic PUCCHs 104. The persistent PUCCH may be further divided into persistent PUCCH Format 2/2a/2b used for channel state information reporting and persistent PUCCH Format 1/1a/1b used for a persistent ACK/NACK and scheduling request indicator (not shown in FIG. 1). Accordingly, the cell 102 has a number of persistent PUCCHs 105 and a number of dynamic PUCCHs 106.

A problem of the existing solution is that the PUCCH is subject to inter-cell interference, which may deteriorate the coverage of Channel State Indicator (CSI) feedback related to DL CoMP UEs. It is noted that the amount of CSI feedback (including CSI feedback size) increases based on the introduction of DL CoMP (since multi-cell feedback is required).

The solution presented herein also avoids that the PUCCH overhead becomes too large.

The solution presented provides, for a certain geographical area (i.e. a cell or a group of cells depending, e.g., on UE activity), multiple (in particular at least two) PUCCH resource pools applicable for the UEs in that geographical area.

The PUCCH resource pool can be identified by at least one of the following attributes:

A pre-defined PUCCH sequence group or a sequence group hopping pattern;

A pre-defined PUCCH physical layer cell identity to derive, e.g., pseudo-random hopping patterns. It is noted that PUCCH physical layer cell identity can be used to also define a PUCCH sequence group or a sequence group hopping pattern.

The available PUCCH resource pools can be configured using higher layer signaling. Higher layer signaling can be UE-specific and may contain PUCCH sequence group and/or PUCCH physical layer cell identity. PUCCH physical layer cell identity may be different than the cell identity contained on the system information. Nevertheless, one of the resource pools may correspond to a cell-specific PUCCH derived from system information.

It is an option that each of the PUCCH resource pools is backwards compatible (i.e., it can support legacy UEs).

Figure 2:
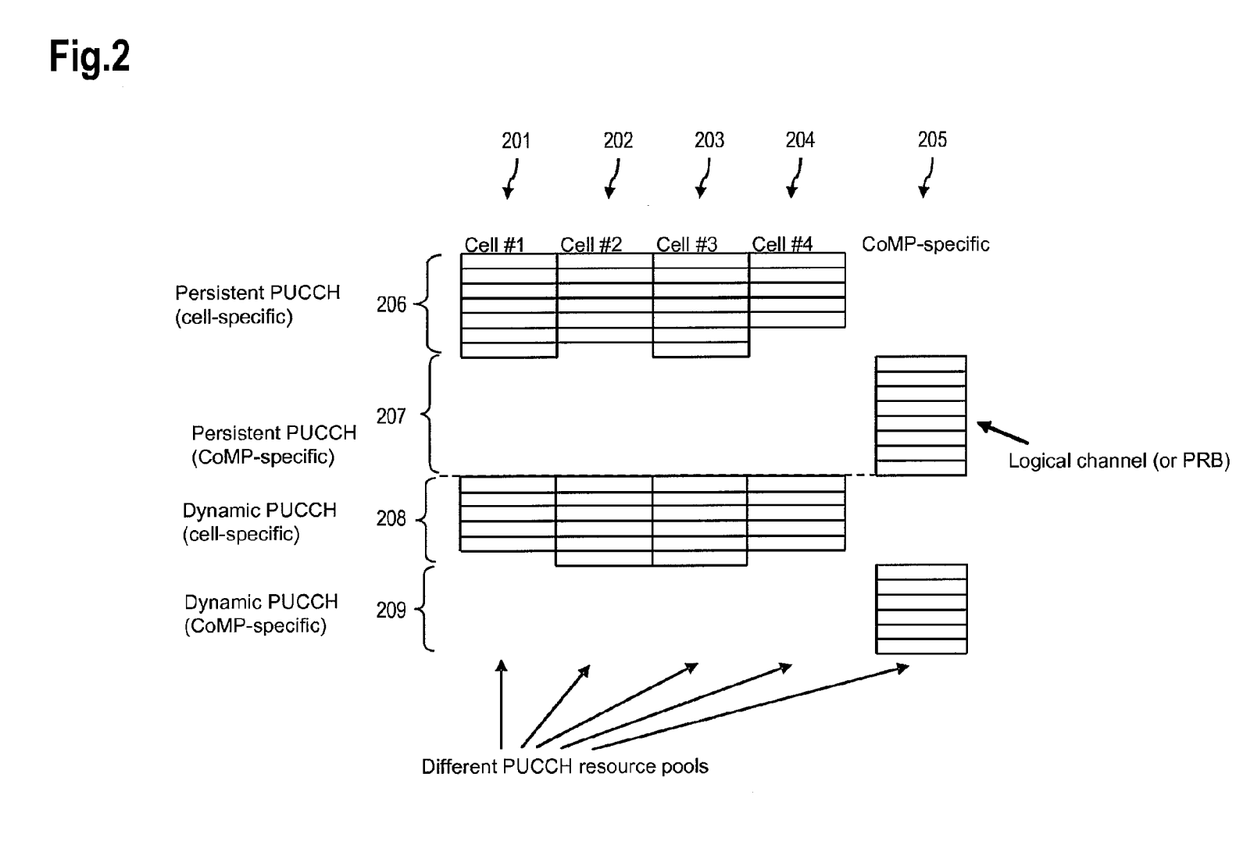
FIG. 2 shows a schematic diagram comprising different PUCCH resource pools for different cells and for a CoMP-specific resource pool.

FIG. 2 shows a schematic diagram comprising different PUCCH resource pools for different cells 201 to 204 and for a CoMP-specific resource pool 205. The PUCCH resource pools for cells 201 to 204 each comprise cell-specific persistent PUCCHs 206 and cell-specific dynamic PUCCHs 208. The CoMP-specific resource pool 205 comprises persistent PUCCHs 207 and dynamic PUCCHs 209.

Hence, the PUCCH is divided into two parts, i.e.

the cell-specific PUCCHs 206, 208 having separate PUCCH resource pool allocated to different cells 201 to 204; and the CoMP-specific PUCCHs 207, 209 having common PUCCH resource pool allocated to multiple cells. It is noted that PUCCHs in a carrier aggregation scenario can be seen as a special case thereof. It is further noted that multiple CoMP-specific PUCCHs may be defined for a certain geographical area.

The cell-specific PUCCH, resources may be spatially separated between cells so as not to interfere with each other. Then UEs can be configured with multiple PUCCH configurations for different setups (e.g., cell-specific PUCCH/CoMP (area)-specific PUCCH). An advantage of this approach is that when the CoMP feedback increases, due to the separation of the PUCCH resources, inter-cell interference does not have a large impact. Also, the PUCCH overhead, i.e., number of physical resource blocks reserved for PUCCH, can be reduced.

PUCCH blanking (i.e., over dimensioning of the cell-specific persistent PUCCH region) is configured in a proper manner in each of the cells to make room for CoMP specific persistent PUCCH; it is noted that PUCCH blanking can be used also for CoMP-specific PUCCHs to make room for cell-specific persistent PUCCHs as well as cell-specific dynamic PUCCHs.

The basic idea of PUCCH blanking is to over-dimension a PUCCH region, i.e., allocate more resources/PRBs to PUCCH usage than strictly required, and to leave the outermost PRBs unused. In this manner the UL bandwidth can be reduced symmetrically with respect to the center frequency to meet, for example, requirements of a certain operator. For further details on PUCCH blanking, reference is made to US 2010/0142467 A1 and its mentioned and incorporated references in this regard.

In this context, PUCCH blanking is applied by leaving the innermost PRBs unused on cell-specific persistent PUCCHs to make room for CoMP-specific persistent PUCCH. On the other hand, outermost PRBs are left unused on CoMP-specific persistent PUCCH to make room for cell-specific persistent PUCCHs. Also the innermost PRBs of CoMP-specific persistent PUCCH are left unused to make room for cell-specific dynamic PUCCHs. It is noted that the blanking of the innermost persistent PUCCH PRBs affects resource allocation of persistent PUCCH format 1/1a/1b resources, whereas blanking of the outermost persistent PUCCH PRBs, considered in the aforementioned reference, affects resource allocation of persistent PUCCH format 2/2a/2b resources.

According to an embodiment, separate PUCCH configuration parameters such as "delta shift" and a starting position of dynamic PUCCH can be used for cell-specific PUCCH and CoMP-specific PUCCH.

It is noted that a resource pool is in particular defined by a PUCCH sequence group and/or a PUCCH physical layer cell identity. A set of PUCCH resources is referred to when also PRB allocation is combined with the resource pool configuration. Hence,

- CoMP-specific and cell-specific PUCCH can share the same resource pool, but may have separate resources as they use different PRBs;
- Cell-specific resource pools may have different resources although they use the same PRBs.

In another embodiment, the resource pool (i.e., PUCCH sequence group and PUCCH physical layer cell identity) corresponding to CoMP-specific PUCCH can be shared with one of the cell-specific resource pools in the CoMP area. This could be applicable in particular for a macro-cell or a macro-node, since the coverage area of the macro-cell is expected to overlap with (and potentially include) a coverage area of RRHs.

Using the approach as suggested, the UE can be configured with multiple PUCCH configurations:

(1) The UE can be configured to utilize a cell-specific PUCCH resource pool for both persistent and dynamic PUCCHs (this is the mode of operation for Release-8/9/10 UEs).

(2) UE can be configured to utilize a cell-specific PUCCH sequence group only for persistent PUCCH whereas the dynamic PUCCH follows another PUCCH resource pool configuration, e.g., a CoMP-specific or cooperation area specific configuration.

(3) UE can be configured to utilize a CoMP-specific PUCCH resource pool for both persistent and dynamic PUCCH.

In addition to these configuration options, the UE may utilize dynamic PUCCHs corresponding to both cell-specific and CoMP-specific resource pools.

The cell specific PUCCH may utilize the spatial separation between UEs. The same PUCCH resources can be re-used in certain different geographical areas. Furthermore, the mechanisms may combine a randomization capability with spatial reuse. Current existing spatial re-use mechanisms may be used to provide the necessary randomness between non-orthogonal PUCCH resources in different cell specific PUCCHs.

In order to balance inter-cell orthogonality and overhead, an additional flexibility may be required for an A/N resource allocation on the CoMP-specific PUCCH resource pool due to the fact that the same A/N resource pool may be used in adjacent cells as well. This additional flexibility can be achieved by means of a dynamic A/N modifier index (DAMI) included in DL resource allocation grants. The DAMI is capable of modifying the implicit A/N resource given by the DL resource allocation grant within the CoMP-specific A/N resource. Furthermore, it can be used as a switch between cell-specific and CoMP-specific resources.

Also, the DAMI may indicate which resource and which resource pool the UE should utilize.

It is noted that in many cases it may suffice to have DAMI configured only in certain cells sharing the same CoMP-specific PUCCH resource pool (e.g., for RRH cells). Hence, in such cases, it may be more economical to introduce DAMI bits only to the smallest cells using the CoMP-specific PUCCH resource pool.

The applied PUCCH strategy can be configured via higher layers or via dynamic layer-1 signaling and in a UE-specific manner. It is possible to have CoMP/coordination area-specific PUCCH parameters included in the cell-specific system information.

It is an option to introduce PRB separation between two different PUCCH parts (cell-specific and CoMP-specific).

Figure 3:
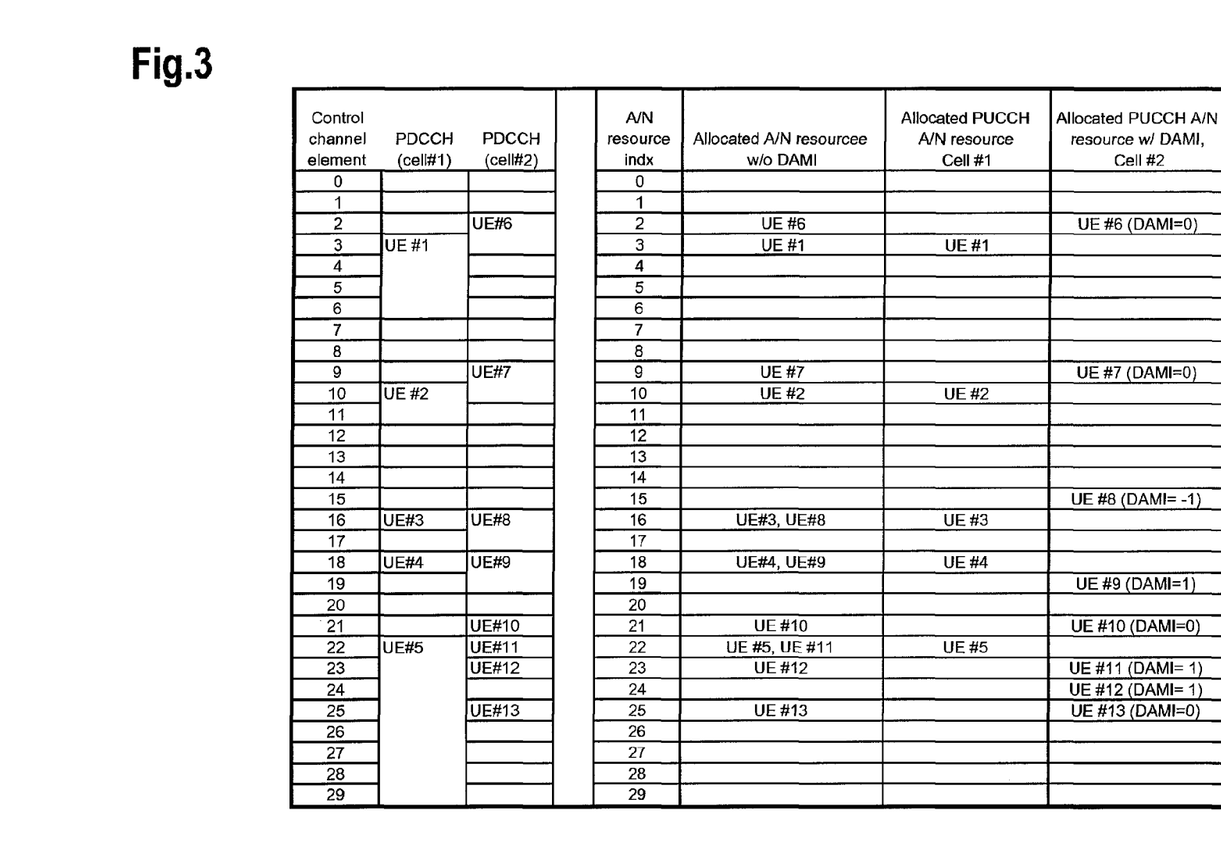
FIG. 3 shows a schematic diagram illustrating the principle of DAMI operation applied for dynamically scheduled PDSCH in which the dynamic A/N space is shared by two cells #1 and #2.

FIG. 3 shows a schematic diagram illustrating the principle of DAMI operation applied for dynamically scheduled PDSCH in which the dynamic A/N space is shared by two cells #1 and #2.

In this example DAMI consists of two bits with values [−1, 0, 1, 2]. The A/N resource corresponding to the 2nd cell #2 can be derived according to the lowest CCE of the PDCCH in the following way:

$$n_{PUCCH}^{(1)} = n_{CCE} + N_{PUCCH}^{(CoMP)} + DAMI,$$

wherein $n_{CCE}$ is the number of the first CCE used for transmission of the corresponding Downlink Control Information (DCI) assignment;

$N_{PUCCH}^{(CoMP)}$ is a starting position of a secondary A/N space configured by higher layers.

For example, with regard to control channel element 22 in FIG. 3 it is indicated that a UE#5 and a UE#11 both require A/N resources, which would—without using DAMI—lead to a conflict. This conflict is solved

- by allocating a PUCCH A/N resource for cell #1 for the UE#5 for the resource index 22 and
- by allocating a PUCCH A/N resource for cell #2 for the UE#11 for the resource index 23, indicated by a shift of +1 via DAMI.

Another realization of the DAMI is such that at least certain entries act as a switch within the CoMP-specific PUCCH resource pool and one of the entries indicates that cell-specific resources are used instead. This enables dynamic adaptation of the applied PUCCH resource allocation strategy.

Figure 4:
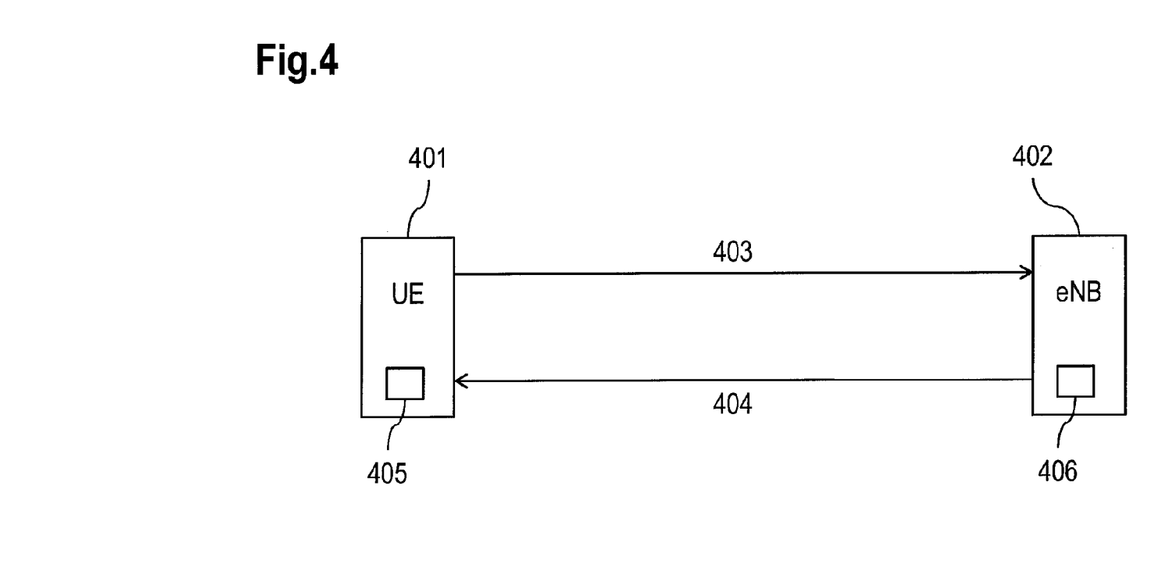
FIG. 4 shows a schematic block diagram comprising a base station (eNB) with a processing unit and a mobile station (UE) with a processing unit.

Further Considerations and Advantages:

FIG. 4 shows a schematic block diagram comprising abase station 402 (eNB) with a processing unit 406 and a mobile station 401 (UE) with a processing unit 405. The communication from the UE 401 to the eNB 402 is referred to as uplink communication 403 and the opposite direction is referred to as downlink communication 404. Each of the communications 403, 404 may comprise payload data, signaling information and/or control information. It is noted that several UEs may be present within a coverage area of the eNB 402. It is also noted that several base stations may provide several coverage areas.

It is also noted that the functionality described herein can be implemented with the processing units of the base stations and/or the mobile stations. In addition, a device may provide a combined or distributed functionality.

It is noted that the block structure shown in any of the figures could be implemented by a person skilled in the art in various ways, e.g., by providing various physical units. The base station or the mobile station, in particular the processing units, could be realized each as at least one logical entity that may be deployed as hardware, program code, e.g., software and/or firmware, running on a processor, e.g., a computer, microcontroller, ASIC, FPGA and/or any other logic device.

The functionality described herein may be based on an existing component of a (wireless) network, which is extended by means of software and/or hardware. The eNB mentioned herein could also be referred to as any base station pursuant to any communication standard. Accordingly, the mobile station or UE could be any mobile station, terminal, device or the like with an interface to a mobile communication system, in particular a radio network or wireless communication network.

The proposed solution is compatible with legacy UEs. It allows utilizing orthogonal and non-orthogonal resources in an optimized manner. PUCCH coverage can be maintained when significantly increasing the CSI payload (which may be a requirement for CoMP). Also, the size of CoMP-area specific PUCCH can be minimized thereby also reducing the PUCCH overhead. The approach can be flexibly used in various CoMP deployment scenarios.

LIST OF ABBREVIATIONS

A/N Acknowledgement/Non-Acknowledgement
ACK/NACK Acknowledgement/Non-Acknowledgement
CCE Control Channel Element
CoMP Cooperative MultiPoint
CQI Channel Quality Indicator
CSI Channel State Indicator
DAMI Dynamic A/N Modifier Index
DCI Downlink Control Information
DL Downlink
eNB evolved NodeB (base station)
ID Identification
LTE Long Term Evolution
NB NodeB (base station)
PRB Physical Resource Block
PUCCH Physical Uplink Control Channel
PUSCH Physical Uplink Shared Channel
RB Resource Block
RRH Remote Radio Head
SC-FDMA Single Carrier Frequency Division Multiple Access
UE User Equipment
UL Uplink

The invention claimed is:

1. A method comprising:
obtaining, by a mobile terminal from a communication network, information indicating that at least two resource pools are provided by the communication network for transmission of a single uplink control channel from the mobile terminal,
wherein a resource pool is identified via a sequence group or sequence group hopping pattern, and
wherein the at least two resource pools comprise:
a cell-specific uplink control channel resource pool with separate cell-specific uplink control channel resources allocated to different cells, and
a cooperative multipoint-specific uplink control channel resource pool with common uplink control channel resources allocated to multiple cells,
performing a switching, by the mobile terminal, between using the cell-specific uplink control channel resource pool and using the cooperative multipoint-specific uplink control channel resource pool in response to a modifier index conveyed in a downlink resource allocation message from said communication network, for the transmission of the single uplink control channel from the mobile terminal;
wherein the cooperative multipoint-specific uplink control channel resource pool is determined for a geographical area;
wherein the modifier index in the downlink resource allocation message further enables a modification or shift of an allocated uplink physical resource block.

2. The method according to claim 1, wherein the at least two uplink control channel resource pools comprise more than one cooperative multipoint-specific uplink control channel resource pools.

3. The method according to claim 1, wherein the cell-specific uplink control channel resource pool is configured via system information.

4. The method according to claim 1, wherein uplink control channel blanking is used to free resources for the cooperative multipoint-specific uplink control channel resource pool.

5. The method according to claim 1, wherein an uplink control channel resource corresponding to the cooperative multipoint-specific uplink control channel resource pool is shared with the cell-specific uplink control channel resource pool.

6. The method according to claim 1, wherein
the cell-specific uplink control channel resource pool comprises a persistent uplink control channel resource pool and a dynamic uplink control channel resource pool and
the cooperative multipoint-specific uplink control channel resource pool comprises a persistent uplink control channel resource pool and a dynamic uplink control channel resource pool.

7. The method according to claim 6, comprising utilizing one of the following:
the cell-specific persistent and dynamic uplink control channel resource pools;
the persistent cell-specific uplink control channel resource pool and the dynamic cooperative multipoint-specific uplink control channel resource pool;
the persistent and the dynamic cooperative multipoint-specific uplink control channel resource pool.

8. The method according to claim 1, wherein each uplink control channel resource pool is identified via a cell identity associated with the transmission of the uplink control channel.

9. The method according to claim 1, wherein the uplink control channel is a PUCCH.

10. An apparatus comprising at least one processor and at least one memory including computer program code, wherein the at least one memory and the computer code are configured, with the at least one processor, to cause the apparatus to at least perform or control the following:
configuring a mobile terminal to support at least two uplink control channel resource pools for transmission of a single uplink control channel from the mobile terminal,
wherein a resource pool is identified via a sequence group or sequence group hopping pattern, and
wherein the at least two resource pools comprise:
a cell-specific uplink control channel resource pool with separate cell-specific uplink control channel resources allocated to different cells, and
a cooperative multipoint-specific uplink control channel resource pool with common uplink control channel resources allocated to multiple cells,
transmitting to the mobile terminal, a modifier index conveyed in a downlink resource allocation message indicating the mobile terminal to perform a switching between using the cell-specific uplink control channel resource pool and using the cooperative multipoint-specific uplink control channel resource pool for the transmission of the single uplink control channel from the mobile terminal;
wherein the cooperative multipoint-specific uplink control channel resource pool is determined for a geographical area;

wherein the modifier index in the downlink resource allocation message further enables a modification or shift of an allocated uplink physical resource block.

11. An apparatus comprising at least one processor and at least one memory including computer program code, wherein the at least one memory and the computer code are configured, with the at least one processor, to cause the apparatus to at least perform or control the following:

obtaining, by a mobile terminal from a communication network, information indicating at least two resource pools are provided by the communication network for transmission of a single uplink control channel from the mobile terminal, wherein a resource pool is identified via a sequence group or sequence group hopping pattern, and wherein the at least two resource pools comprise:

a cell-specific uplink control channel resource pool with separate cell-specific uplink control channel resources allocated to different cells, and a cooperative multipoint-specific uplink control channel resource pool with common uplink control channel resources allocated to multiple cells, and performing a switching, by the mobile terminal, between using the cell-specific uplink control channel resource pool and using the cooperative multipoint-specific uplink control channel resource pool in response to a modifier index conveyed in a downlink resource allocation message from said communication network, for the transmission of the single uplink control channel from the mobile terminal;

wherein the cooperative multipoint-specific uplink control channel resource pool is determined for a geographical area;

wherein the modifier index in the downlink resource allocation message further enables a modification or shift of an allocated uplink physical resource block.

12. A method comprising:

configuring a mobile terminal to support at least two uplink control channel resource pools for transmission of a single uplink control channel from the mobile terminal, wherein a resource pool is identified via a sequence group or sequence group hopping pattern, and wherein the at least two resource pools comprise:

a cell-specific uplink control channel resource pool with separate cell-specific uplink control channel resources allocated to different cells, and a cooperative multipoint-specific uplink control channel resource pool with common uplink control channel resources allocated to multiple cells, and transmitting to the mobile terminal, a modifier index conveyed in a downlink resource allocation message indicating the mobile terminal to perform a switching between using the cell-specific uplink control channel resource pool and using the cooperative multipoint-specific uplink control channel resource pool for the transmission of the single uplink control channel from the mobile terminal;

wherein the cooperative multipoint-specific uplink control channel resource pool is determined for a geographical area;

wherein the modifier index in the downlink resource allocation message further enables a modification or shift of an allocated uplink physical resource block.

13. The method according to claim 12, wherein the cell-specific uplink control channel resource pool is configured via system information.

14. The method according to claim 12, wherein the cell-specific uplink control channel resource pool comprises a persistent uplink control channel resource pool and a dynamic uplink control channel resource pool and the cooperative multipoint-specific uplink control channel resource pool comprises a persistent uplink control channel resource pool and a dynamic uplink control channel resource pool.

15. The method according to claim 14, comprising utilizing one of the following:

the cell-specific persistent and dynamic uplink control channel resource pools;

the persistent cell-specific uplink control channel resource pool and the dynamic cooperative multipoint-specific uplink control channel resource pool;

the persistent and the dynamic cooperative multipoint-specific uplink control channel resource pool.

16. The method according to claim 12, wherein each uplink control channel resource pool is identified via a cell identity associated with the transmission of the uplink control channel.

17. The method according to claim 12, wherein the uplink control channel is a PUCCH.

\* \* \* \* \*